US012337496B1

(12) United States Patent
Silva Arbizu

(10) Patent No.: US 12,337,496 B1
(45) Date of Patent: Jun. 24, 2025

(54) FOOD SLICING APPARATUS

(71) Applicant: Jairo Silva Arbizu, Concord, CA (US)

(72) Inventor: Jairo Silva Arbizu, Concord, CA (US)

( * ) Notice: Subject to any disclaimer, the term of this patent is extended or adjusted under 35 U.S.C. 154(b) by 284 days.

(21) Appl. No.: 17/960,650

(22) Filed: Oct. 5, 2022

(51) Int. Cl.
*B26D 3/26* (2006.01)
*B26D 5/10* (2006.01)
*B26D 7/06* (2006.01)
*B26D 7/32* (2006.01)

(52) U.S. Cl.
CPC ................. *B26D 3/26* (2013.01); *B26D 5/10* (2013.01); *B26D 7/0691* (2013.01); *B26D 7/32* (2013.01); *B26D 2210/02* (2013.01)

(58) Field of Classification Search
CPC .. B26D 3/26; B26D 2210/02–08; B26D 7/32; B26D 7/0691
See application file for complete search history.

(56) References Cited

U.S. PATENT DOCUMENTS 173,201 A * 2/1876 Adt ...................... B26D 7/0625 83/257
1,898,160 A * 2/1933 Aeschbach ............ B26D 3/225 83/591
2,169,323 A * 8/1939 Martinet ............... A47J 43/255 83/167
3,704,736 A * 12/1972 Pratley ................... B26D 7/225 83/DIG. 1
3,972,256 A * 8/1976 Ross ........................ B26D 7/32 83/703
4,226,374 A * 10/1980 Kafka ...................... B26D 3/22 241/37.5
4,277,995 A * 7/1981 Sontheimer .............. B26D 3/22 83/592
4,283,979 A * 8/1981 Rakocy .................. B26D 3/225 83/591
4,345,498 A 8/1982 Best
4,364,525 A * 12/1982 McClean ............... B26D 3/225 241/282.1
4,368,657 A * 1/1983 Pellaton ................... B26D 1/29 83/592
4,397,206 A * 8/1983 Czala ..................... B26D 7/225 83/729
4,598,620 A 7/1986 Flammann
4,960,025 A * 10/1990 Fitch ........................ B26D 7/34 83/411.2

(Continued)

*Primary Examiner* — Sean M Michalski
(74) *Attorney, Agent, or Firm* — Sanchelima & Associates, P.A.; Jesus Sanchelima; Christian Sanchelima

(57) ABSTRACT

A food slicing apparatus including a housing assembly, a cutting assembly, and a reservoir assembly. The housing assembly includes a housing and a pressing element. The housing has an opening. The opening is in an uppermost end of the housing. Food can be introduced to the opening. The cutting assembly includes upper blades and a circular blade. The cutting assembly is inside the housing assembly. The pressing element can be introduced through the opening to press the food against the circular blade. The upper blades are separated a predetermined distance from the circular blade. The upper blades are used to slice the food when introduced. The reservoir assembly includes a reservoir. The circular blade pushes out the sliced fruit to the reservoir. The reservoir is removably attached beneath the housing.

11 Claims, 5 Drawing Sheets

(56) References Cited

U.S. PATENT DOCUMENTS

| | | | | | |
|---|---|---|---|---|---|
| 5,983,769 | A * | 11/1999 | Schneider | B26D 3/22 83/437.2 |
| 6,619,170 | B2 * | 9/2003 | Kaplan | B26D 7/0641 83/167 |
| 8,635,948 | B2 * | 1/2014 | Herren | A47J 43/046 241/199.2 |
| 8,814,072 | B2 * | 8/2014 | Gushwa | A47J 43/0716 241/37.5 |
| 8,905,342 | B2 * | 12/2014 | Gushwa | A47J 43/0716 241/92 |
| 9,370,278 | B1 * | 6/2016 | Suquet | A47J 43/24 |
| 11,325,274 | B1 * | 5/2022 | Leung | B26D 7/2614 |
| 2009/0090254 | A1 * | 4/2009 | Herren | A47J 23/00 241/199.12 |
| 2010/0154658 | A1 * | 6/2010 | Conti | A47J 43/0711 83/167 |
| 2010/0170404 | A1 * | 7/2010 | Hensel | A47J 43/0722 241/282.1 |
| 2011/0139017 | A1 * | 6/2011 | Beber | A47J 43/085 241/100 |
| 2013/0134246 | A1 * | 5/2013 | Gushwa | A47J 43/0716 241/36 |

* cited by examiner

FOOD SLICING APPARATUS

BACKGROUND OF THE INVENTION

1. Field of the Invention

The present invention relates to a food slicing apparatus and, more particularly, to a food slicing apparatus that protects a user from getting hurt when slicing food.

2. Description of the Related Art

Several designs for slicing apparatus have been designed in the past. None of them, however, include an adjustable blade to slice food which allows to slice food having different thickness.

Applicant believes that a related reference corresponds to U.S. Pat. No. 4,598,620 issued for a foodstuff slicing machine with a motor, a rotating blade, and a spring based guarding member. Applicant believes that another related reference corresponds to U.S. Pat. No. 4,345,498 issued for a food slicing machine with a motor driven blade. None of these references, however, teach of a food slicing device that is comprised of a motor driven electrical appliance which uses a drive belt to rotate a cutting blade that is covered by a guard member which allows the user to adjust the thickness of the slices being formed.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide a food slicing apparatus that includes a housing that covers a rotating blade and protects the user from accidentally get hurt by that blade.

It is another object of this invention to provide a food slicing apparatus that includes a housing having an opening to introduce food therethrough.

It is still another object of the present invention to provide a food slicing apparatus that includes a lid to seal the aforementioned housing when slicing.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
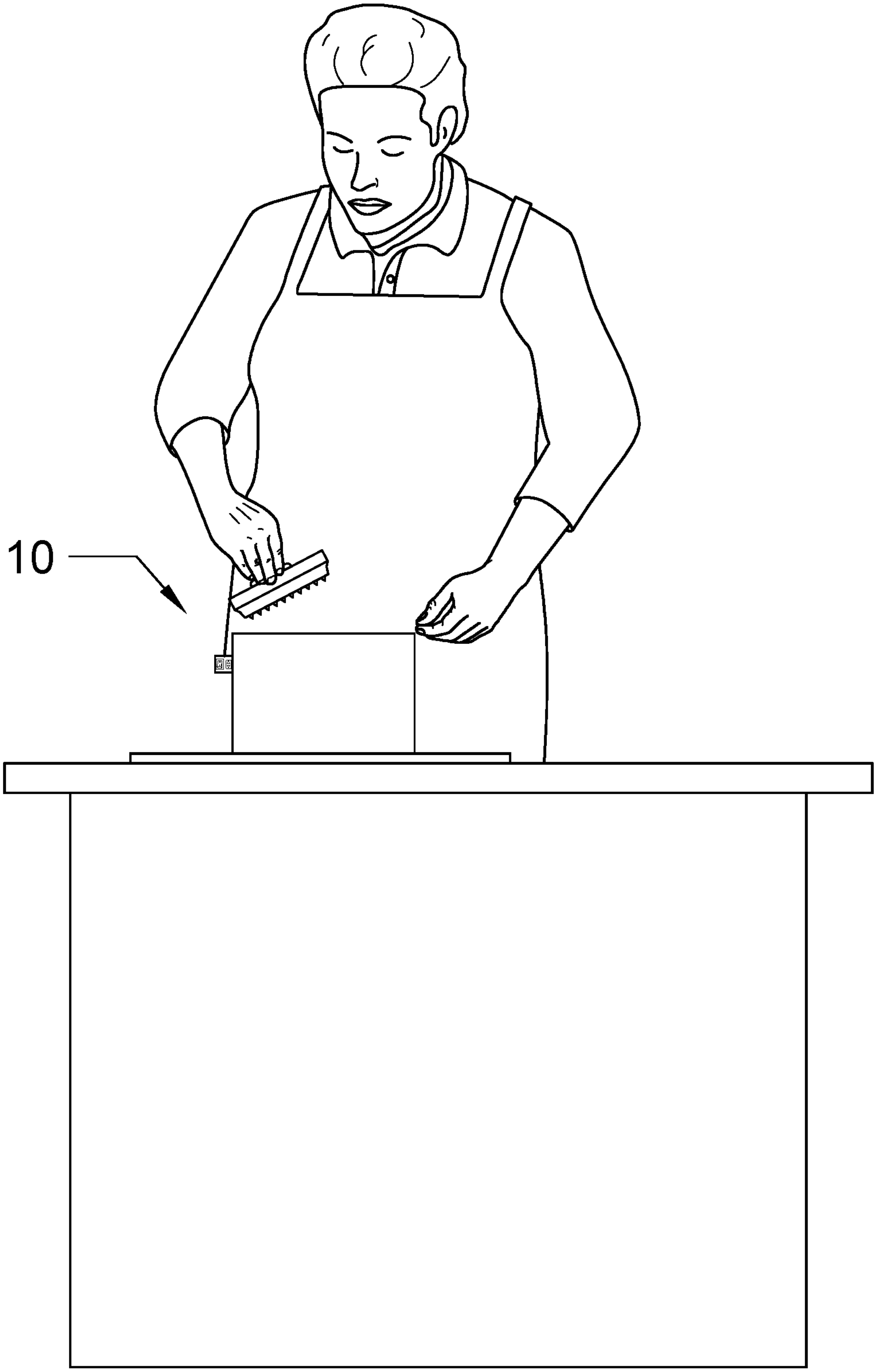
FIG. 1 represents an isometric operational view of the present invention 10 wherein a user is pressing the lid 28 to slice food.
Figure 2:
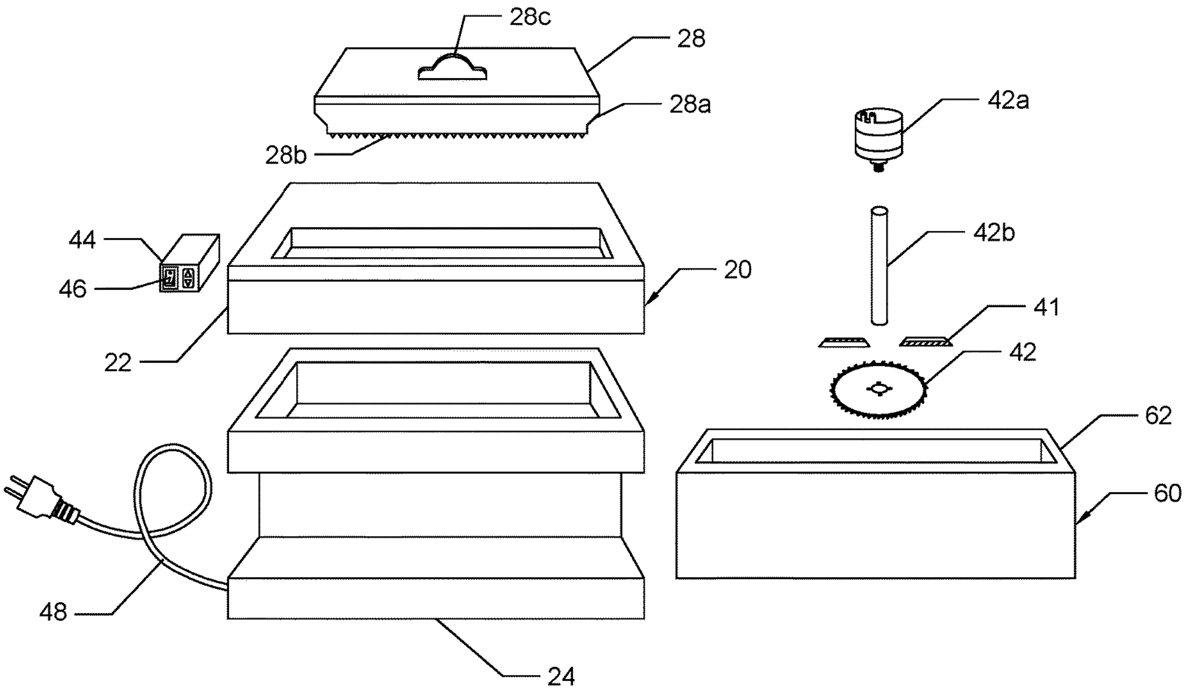
FIG. 2 shows an exploded view of the present invention 10.
Figure 3:
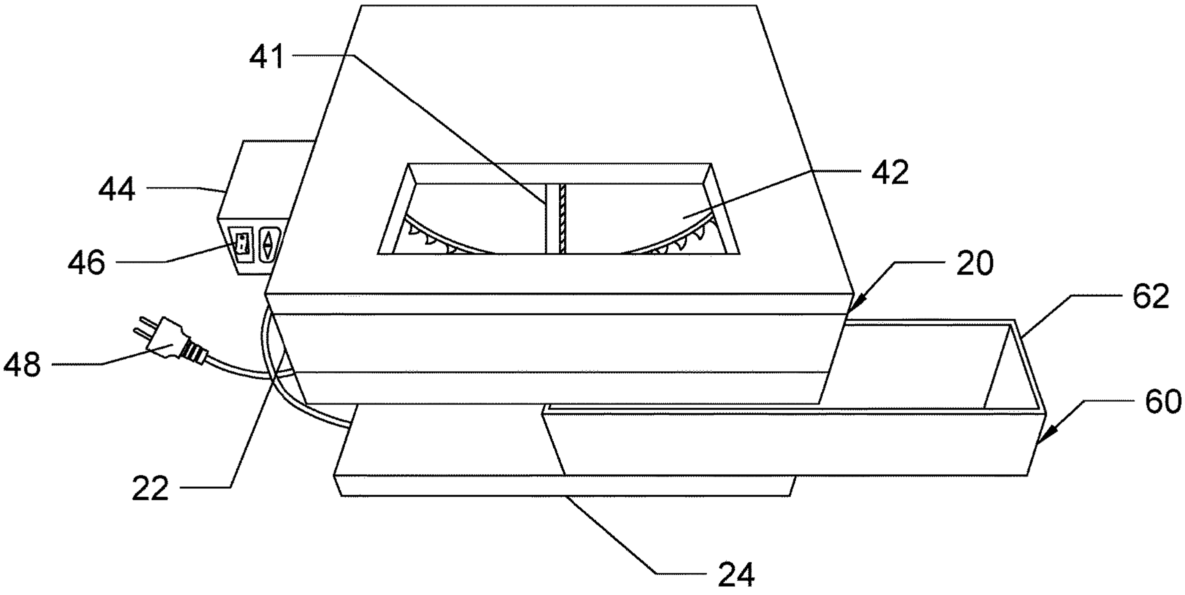
FIG. 3 illustrates a top perspective view of the present invention 10 in an open configuration having the storage assembly 60 slide.

Referring now to the drawings, where the present invention is generally referred to with numeral 10, it can be observed that it basically includes a housing assembly 20, a cutting assembly 40 and a reservoir assembly 60. It should be understood there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

Figure 4:
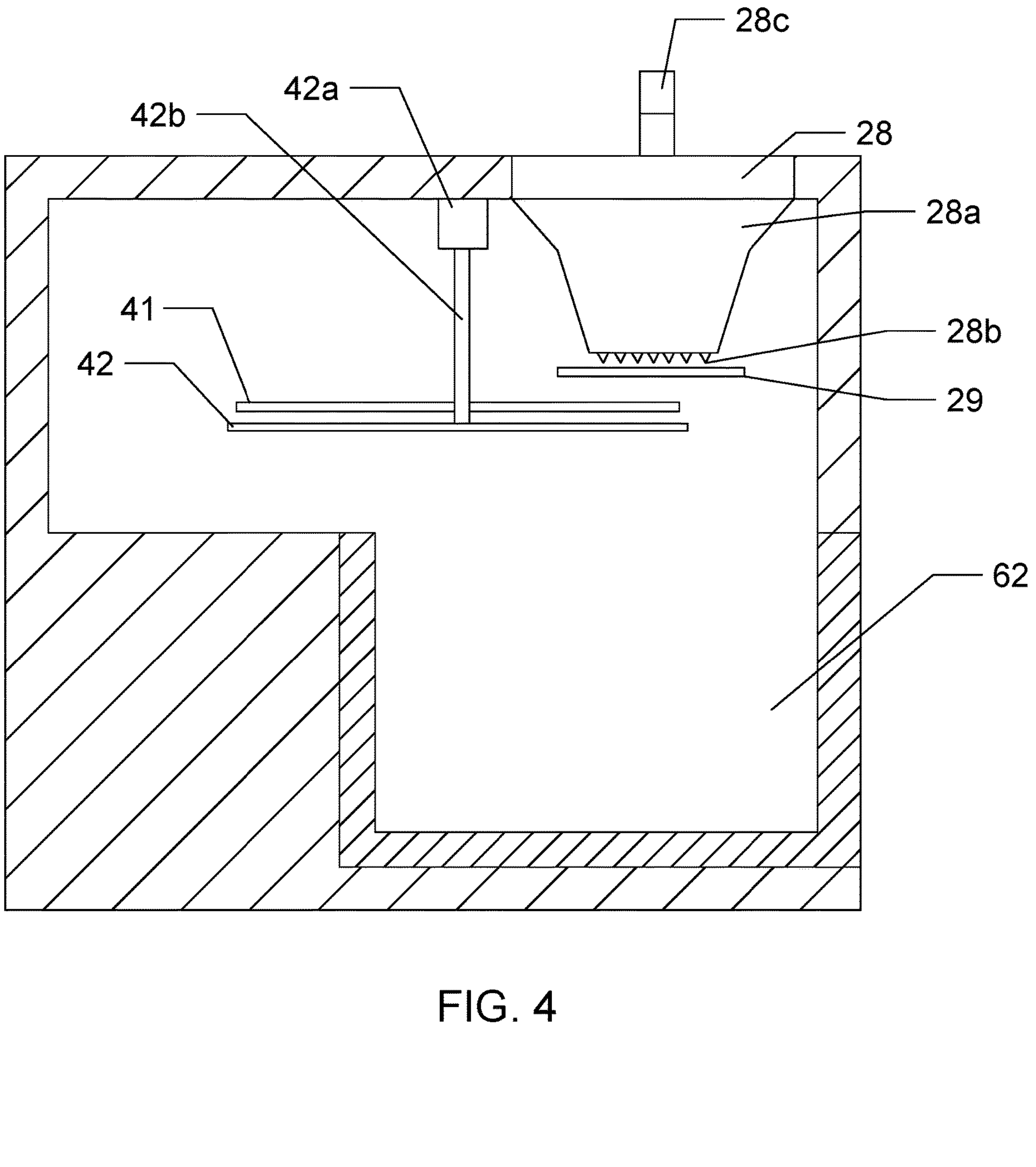
FIG. 4 is a representation of a cross sectional view of the present invention 10.
Figure 5:
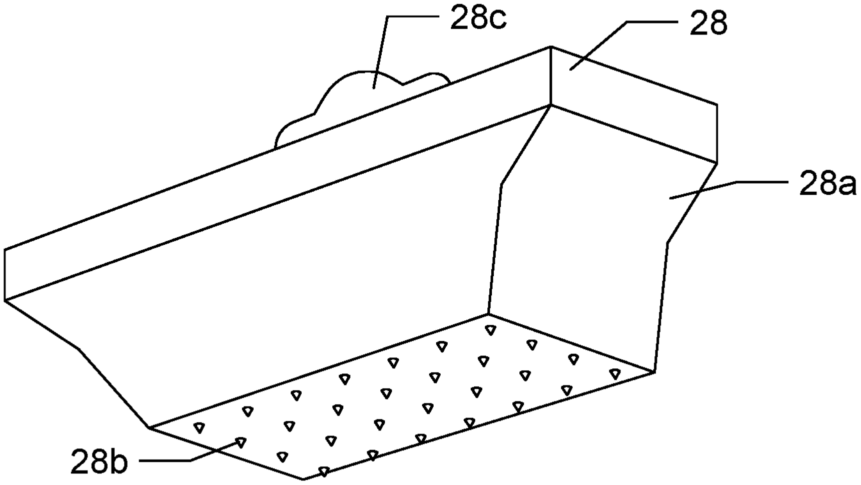
FIG. 5 depicts a bottom perspective view of the lid 28.
Figure 6:
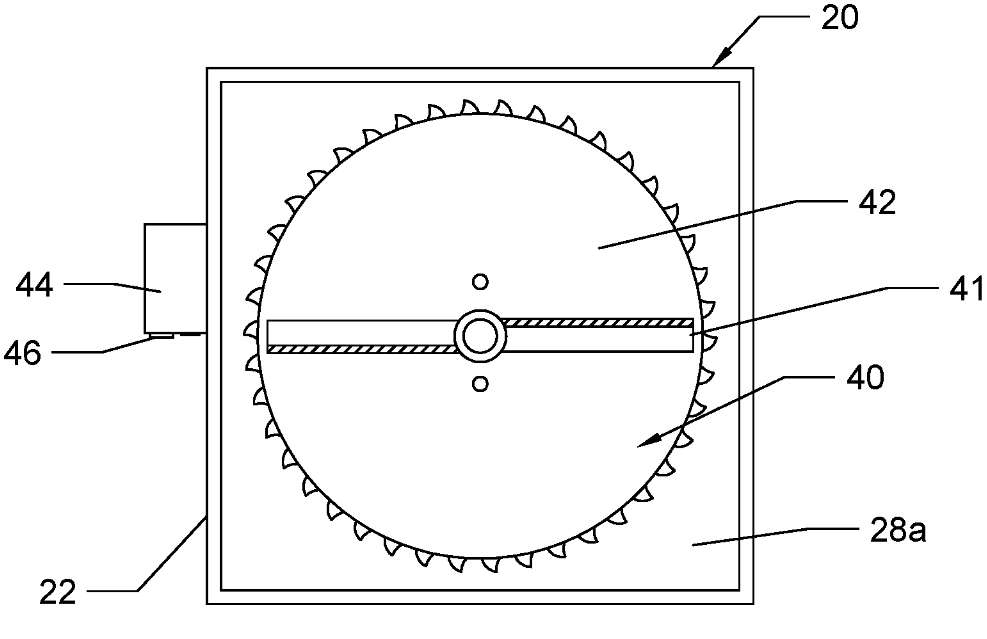
FIG. 6 shows a bottom view of the blade assembly 40.

The housing assembly 20 may include a housing 22, a bottom enclosing element 24 and a pressing element 28. The housing 22 may have a rectangular shape. It also may be suitable for the housing 22 to have a cylindrical shape, a triangular shape, or any other suitable shape. The housing 22 may have a right wall, a left wall, a top wall, a front wall, and a rear wall. The housing 22 may be hollow. The housing 22 may be made of plastic metal, or any other suitable material. The top wall of the housing 22 may have an opening. The opening in the top wall of the housing 22 may receive the pressing element 28 therethrough. The pressing element 28 may have a handle **28*c*, a bottom portion 28*a*, and fixing elements 28*b*. As best illustrated in FIG. 4, the top portion of the pressing element 28 may have a rectangular shape. The bottom portion 28*a* may have a tapered shape. It also may be suitable for the pressing element 28 to have a cylindrical shape, a triangular shape, or any other suitable shape. The pressing element 28 may be made of plastic, metal, or any other suitable element. The fixing elements 28*b* may be spikes. As best illustrated in FIG. 5, the fixing elements 28*b* may be placed in a bottommost end of the pressing element 28. The housing 28 may have a stop 29. The stop 29 may be located in an inner portion of the walls of the housing 28. The pressing element 28 may not be inserted further than the stop 29. The stop 29 may hold the pressing element 28 from touching the cutting assembly 40. The handle 28*c* may be located in an uppermost end of the pressing element 28. The handle 28*c* may be made of plastic, metal, wood, or any other suitable material. The handle 28*c* may have any suitable shape to ease the holding of the pressing element 28**.

The bottom enclosing element 24 may be located under the housing 22. The bottom enclosing element 24 may have a rear wall, a bottom wall, and a top wall. The top wall of the bottom enclosing element 24 may be a frame. The top wall of the bottom enclosing element 24 may be hollow. The bottom enclosing element 24 may have a rectangular shape. It also may be suitable for the bottom enclosing element 24 to have a cylindrical shape, a triangular shape, or any other suitable shape. The bottom enclosing element 24 may be connected to the housing 22. The bottom enclosing element 24 may be made of plastic, metal, or any other suitable material. The bottom enclosing element 24 may be suitable to receive the reservoir assembly 60 therethrough.

The cutting assembly 40 may include a circular blade 42, upper blades 41, a shaft 42*b*, a motor 42*a*, a controlling element 44, buttons 46 and a cable 48. The cutting assembly 40 may be located inside the housing 22. The circular blade 42 may have a circular shape. The edges of the circular blade 42 may be threaded. The circular blade 42 may be made of metal. The circular blade 42 may be perpendicularly connected to a bottommost end of the shaft 42*b*. The uppermost end of the shaft 42 may be connected to the motor 42*a*. The shaft 42*b* may have a cylindrical shape. It also may be suitable for the shaft 42*b* to have a rectangular shape, or any other suitable shape. The shaft 42*b* may be made of metal or any other suitable material. The upper blades 41 may be perpendicularly attached to a bottom portion of the shaft 42*b*. The upper blades 41 may be located above the circular blade 42. In a preferred embodiment the upper blades 41 may be two blades diametrically opposite one to the other. The upper blades 41 may be separated a predetermined distance from the circular blade 42. The upper blades 41 may be adjustable along the shaft 42*b* to modify the aforementioned predetermined distance. The upper blades 41 may have a rectangular shape. It also may be suitable for the upper blades 41 to have a circular shape, a triangular shape, or any other suitable shape. The upper blades 41 may be sharp. It should be understood that fasteners or welding may be used to interconnect the elements of the cutting assembly 40. The shaft 42*b* may rotate by means of the motor 42*a*. Thus, the circular blade 42 and the upper blades 41 may rotate. It should be understood that belts, gears, or an additional motor may be needed to rotate and control speed rotation of the shaft 42*b*.

The controlling element 44 may be located in a left portion of the housing 22. It also may be suitable for the controlling element 44 to have any other configuration on the housing 22. The controlling element 44 may be connected to the motor 42*a*. The controlling element 42 may control the speed of rotation of the upper blades 41, the speed of rotation of the circular blade 42, or the separation between the upper blades 41 and the circular blade 42. The buttons 46 may be used to operate the controlling element 44. The buttons 46 may include a switch, speed controller buttons, a position controller button, or any other suitable button. The controlling element 44 and the motor 42*a* may be connected to the cable 48. The cable 48 may be connected to the electric outlet to provide power to the controlling element 44 and the motor 42*a*. The motor may actuate the shift 42*b* to rotate at a predetermined speed.

The reservoir assembly 60 may include a reservoir 62. The reservoir 62 may have a rectangular shape. It also may be suitable for the reservoir 62 to have a circular shape, a triangular shape, a cuboid shape, or any other suitable shape. The reservoir 62 may be made of plastic, metal, or any other suitable material. The reservoir 62 may have a bottom wall, a right wall, a left wall, a rear wall, and a front wall. The reservoir 62 may be removably attached to the bottom enclosing element 24. The reservoir 62 may be coupled under the housing 22. The reservoir 62 may be used to store sliced food that is cut by the upper blades 41 or the circular blade 42.

In a preferred embodiment a person may introduce food through the opening of the housing 22 and the upper blades 41 may rotate to slice the food. The pressing element 28 may be introduced through the opening of the housing 22 to press the food against the circular blade 42. The fixing elements 28*b* may prevent movement of the food when introduced into the housing 22. The upper blades 41 may rotate to slice the food. The predetermined separation between the upper blades 41 and the circular blade 42 may define the thickness of the slices of food. The circular blade 42 may rotate to push out the sliced food from the housing 22 to the reservoir 62. Reservoir 62 may store the sliced food. The reservoir 62 may be detached from the bottom enclosing 24 to access the sliced food.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A food slicing apparatus, comprising:

a housing assembly, wherein said housing assembly includes a housing, said housing has an opening, said opening is in an uppermost end of said housing, said housing includes a pressing element, said pressing element is introduced through said opening, said housing is hollow;

a cutting assembly, wherein said cutting assembly is inside of said housing, wherein said cutting assembly includes upper blades and a circular blade, wherein said upper blades are configured to rotate to slice food, said food is introduced through said opening, said circular blade is configured to rotate to push out said sliced food, said upper blades is separated a predetermined distance from said circular blade; and a reservoir assembly, wherein said reservoir assembly includes a reservoir, said reservoir is beneath said housing, said reservoir is configured to store the sliced food pushed by the circular blade.

2. The food slicing apparatus set forth in claim 1, wherein said housing has a bottom portion and a top portion, said top portion has a rear wall, a front wall, a left wall, a right wall, and a top wall.

3. The food slicing apparatus set forth in claim 2, wherein said bottom portion has a rear wall and a bottom wall, said bottom portion is configured to support said top portion, said reservoir is detachable from said housing.

4. The food slicing apparatus set forth in claim 1, wherein said pressing element includes a handle, said handle is adapted to hold said pressing element, said pressing element is adapted to fit in said opening.

5. The food slicing apparatus set forth in claim 1, wherein said pressing element includes fixing elements, said fixing elements are spikes, said fixing element is adapted to restrict movement of said fruit when inserted through said opening.

6. The food slicing apparatus set forth in claim 1, wherein said cutting assembly further includes a motor, a controlling element, and a shaft, wherein said circular blade is perpendicularly connected to a bottommost end of said shaft, said motor is connected to an uppermost end of said shaft, said upper blades are connected to a bottom portion of said shaft, said upper blades are above said circular blade.

7. The food slicing apparatus set forth in claim 6, wherein said motor is capable of rotate said shaft to rotate said upper blades and said circular blade.

8. The food slicing apparatus set forth in claim 6, wherein said upper blades are rectangular blades diametrically opposed.

9. The food slicing apparatus set forth in claim 7, wherein said controlling element is operated to modify rotational speed of said shaft, said controlling element is operated to modify said predetermined distance of separation.

10. A food slicing apparatus, comprising:

a housing assembly, wherein said housing assembly includes a housing, said housing has an opening, said opening is in an uppermost end of said housing, said housing includes a pressing element, said pressing element is introduced through said opening, said housing is hollow;

a cutting assembly, wherein said cutting assembly is inside of said housing, wherein said cutting assembly includes upper blades, a motor, a controlling element, a shaft, and a circular blade, wherein said circular blade is perpendicularly connected to a bottommost end of said shaft, said motor is connected to an uppermost end of said shaft, said upper blades are perpendicularly connected to a bottom portion of said shaft, said upper blades are above said circular blade, said upper blade is separated a predetermined distance from circular blade, said motor is capable of rotate said shaft to rotate said upper blades and said circular blade, said upper blades are configured to rotate to slice food, said food is introduced through said opening, said circular blade is configure to rotate to push out said sliced food from said housing, said upper blades are rectangular blades diametrically opposed one to the other, said controlling element is operated to modify operational speed of said shaft, said controlling element is operated to modify said predetermined distance; and a reservoir assembly, wherein said reservoir assembly includes a reservoir, said reservoir is beneath said housing, said reservoir is configured to store the sliced food pushed by the circular blade.

11. A food slicing apparatus, consisting of:

a housing assembly, wherein said housing assembly includes a pressing element, said housing is hollow, said housing has a bottom portion and a top portion, said top portion has a rear wall, a front wall, a left wall, a right wall and a top wall, said top wall of said top portion has an opening, said pressing element is adapted to be introduced through said opening, said bottom portion has a bottom wall and a rear wall, said bottom portion is configured to support said top portion, said pressing element includes a handle and fixing elements, said fixing elements are in a bottommost end of said pressing element, said fixing elements are adapted to restrict movement of food when introduced through said opening;

a cutting assembly, wherein said cutting assembly is inside said top portion of said housing, wherein said cutting assembly includes upper blades, a motor, a controlling element, buttons, a shaft, and a circular blade, wherein said circular blade is perpendicularly connected to a bottommost end of said shaft, said motor is connected to an uppermost end of said shaft, said upper blades are perpendicularly connected to a bottom portion of said shaft, said upper blades are above said circular blade, said upper blade is separated a predetermined distance from circular blade, said motor is capable of rotate said shaft to rotate said upper blades and said circular blade, said upper blades are configured to rotate to slice said food, said food is introduced through said opening, said circular blade is configure to rotate to push out said sliced food from said housing, said upper blades are rectangular blades diametrically opposed one to the other, said controlling element is operated to modify operational speed of said shaft, said controlling element is operated to modify said predetermined distance, said buttons are depressed to operate said controlling element; and a reservoir assembly, wherein said reservoir assembly includes a reservoir, said reservoir is beneath said housing, said reservoir is configured to store the sliced food pushed by the circular blade, said reservoir has a bottom wall, a rear wall, a front wall, a right wall, and a left wall.

* * * * *